United States Patent

Schaenzer et al.

[11] Patent Number: 6,016,692
[45] Date of Patent: Jan. 25, 2000

[54] GLIDE TEST SLIDER HAVING ELECTRICALLY ISOLATED PIEZOELECTRIC CRYSTAL FOR IMPROVED NOISE SUPPRESSION

[75] Inventors: Mark J. Schaenzer, Eagan; Zuxuan Lin, St. Paul; Zine-Eddine Boutaghou, Vadnais Heights, all of Minn.

[73] Assignee: Seagate Technology, Inc., Scotts Valley, Calif.

[21] Appl. No.: 08/967,681

[22] Filed: Nov. 10, 1997

Related U.S. Application Data

[60] Provisional application No. 60/044,341, Apr. 28, 1997.
[51] Int. Cl.[7] .................................................. G01B 17/08
[52] U.S. Cl. ............................................. 73/105; 73/660
[58] Field of Search ..................... 73/660, 105; 360/103, 360/104

[56] References Cited

U.S. PATENT DOCUMENTS

| | | | |
|---|---|---|---|
| 5,038,625 | 8/1991 | Chen | 73/865.9 |
| 5,423,207 | 6/1995 | Flechsig et al. | 73/105 |
| 5,488,857 | 2/1996 | Homma et al. | 73/660 |
| 5,689,064 | 11/1997 | Kennedy et al. | 73/105 |

*Primary Examiner*—John E. Chapman
*Attorney, Agent, or Firm*—Kinney & Lange

[57] ABSTRACT

A high resolution, low noise glide height test slider is provided to detect irregularities on a surface of a rotatable disc. A slider body is arranged to be supported by a support structure in predetermined spaced relation to the surface of the disc as it is rotating. A piezoelectric element on the slider body senses vibration forces acting on the slider body. The slider is electrically isolated from external noise sources.

18 Claims, 6 Drawing Sheets

GLIDE TEST SLIDER HAVING ELECTRICALLY ISOLATED PIEZOELECTRIC CRYSTAL FOR IMPROVED NOISE SUPPRESSION

CROSS-REFERENCE TO RELATED APPLICATION(S)

This application claims priority from Provisional application Ser. No. 60/044,341 filed Apr. 28, 1997 for "Electrically Isolated PZT Crystal For Noise Suppression" by M. Schaenzer, Z. Lin and Z. Boutaghou.

BACKGROUND OF THE INVENTION

The present invention relates to glide height testing for detecting defects in a disc medium, and more particularly to a structure for electrically isolating the piezoelectric crystal on a glide height test slider to improve noise suppression.

In order to certify that a magnetic disc is adequately smooth for use in a disc drive system, glide height tests must be performed on the disc. Glide height testing is used to verify that a magnetic recording disc is able to accommodate a specified glide height. As the density of data recorded on magnetic discs continues to increase, the flying height of magnetic transducers with respect to the disc must be reduced. As a result, the magnetic recording discs must accommodate the lower glide height of the transducer and the slider supporting it. For example, in order to accommodate a glide height on the order of two millionths of an inch, a glide test must be able to detect defects in the magnetic recording disc which are on the order of one millionth of an inch.

In addition to the general requirement of reduced glide height, magnetoresistive (MR) heads, which utilize an active head element made of a thin layer of NiFe, are extremely sensitive to small physical defects in the surface of the disc, such as undulations of the disc surface and microscopic debris on the disc. When the MR head strikes a defect, there is a momentary frictional heating of the MR element, known as a thermal asperity. This heating effect increases the resistance of the MR head, which causes data errors and loss of information in reading the disc.

A common type of glide height testing is performed by utilizing a test slider having a piezoelectric element bonded thereon. When any part of the slider contacts a protrusion on the surface of the disc, the slider vibrates from the impact. The piezoelectric element bonded on the slider senses these vibration forces acting on the slider, and exhibits a voltage between its terminals representative of the forces experienced by the element. If the vibration force sensed by the piezoelectric element exceeds a predetermined design level, or if vibration occurrences exceed a predetermined design frequency, then the disc media under test is not adequately smooth to be used in applications at the glide height being tested. A critical shortcoming of previous piezoelectric glide height testers was the low resolution attainable due to the effects of electrical noise on the piezoelectric crystal. Noise may be picked up by the piezoelectric crystal from external sources in several ways, such as through the test arm and suspension, through the disc spindle and disc, and through the wires from the system electronics to the piezoelectric crystal. As a result, conventional piezoelectric sensors have been unable to detect defects in the disc medium with sufficient resolution to support the reduced flying height required for high data density applications.

BRIEF SUMMARY OF THE INVENTION

The present invention is a high resolution, low noise, glide height test slider for detecting irregularities on a surface of a rotatable disc. A slider body is arranged to be supported by a support structure in predetermined spaced relation to the surface of the disc as it is rotating. A piezoelectric element on the slider body senses vibration forces acting on the slider body. The piezoelectric element is electrically isolated from the support structure. In one form of the invention, the piezoelectric element is also electrically isolated from the slider body. In another form, the slider body is electrically isolated from the surface of the rotatable disc.

In one embodiment of the invention, the slider body is arranged to be directly connected to the support structure, and the piezoelectric element is electrically isolated from the slider body. In a further embodiment, the slider body is arranged to be directly connected to the support structure, the support structure is electrically isolated from the slider body, and the slider body is electrically isolated from the surface of the rotatable disc.

DETAILED DESCRIPTION OF THE PREFERRED EMBODIMENTS

Figure 1:
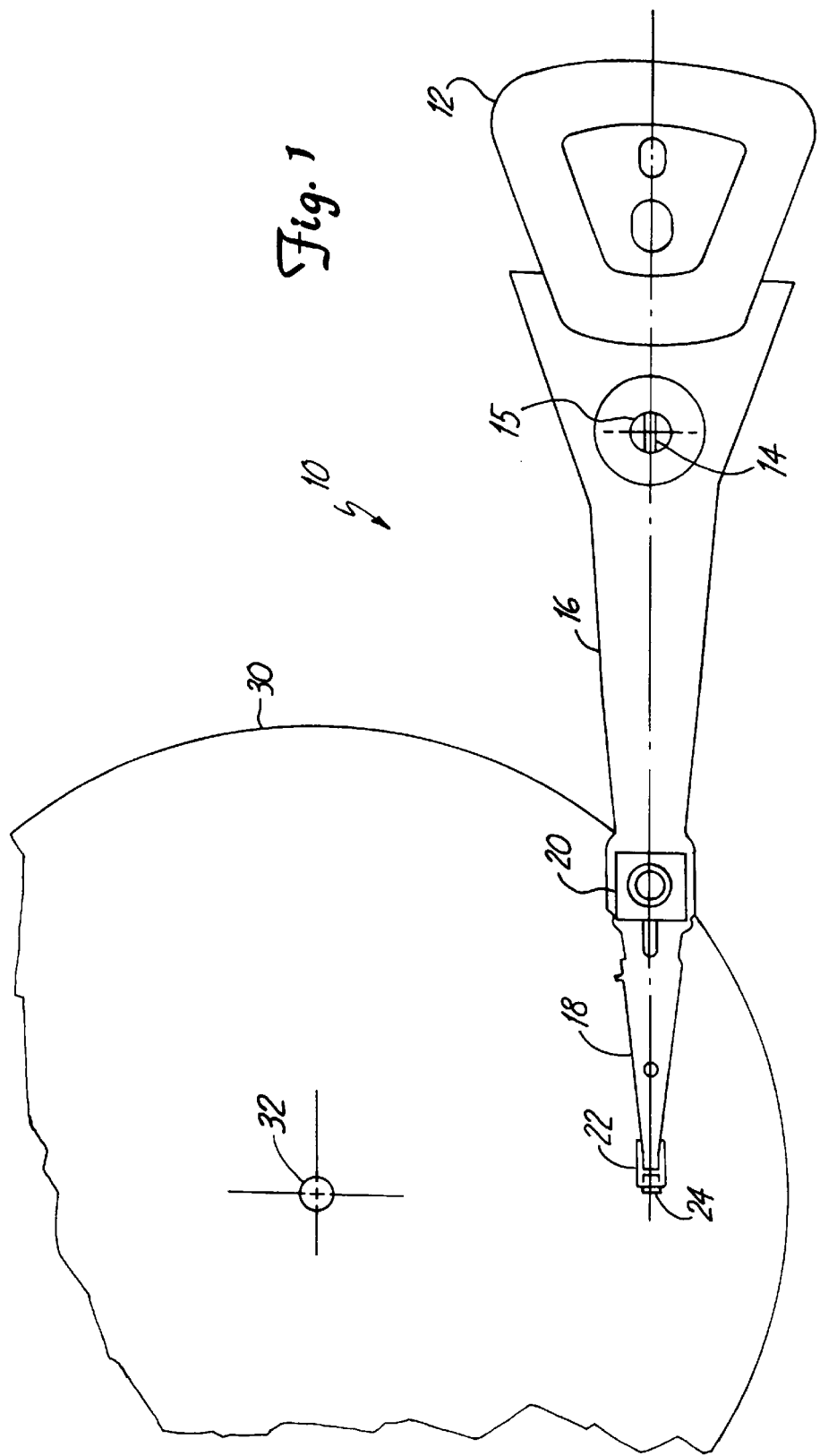
FIG. 1 is a top view of a disc test system for supporting a slider over the surface of a disc.

FIG. 1 is a top view of a disc test system 10 supporting slider 24 over the surface of disc 30. Disc drive system 10 includes an actuator motor 12 arranged to rotate actuator arm 16 around axis 14 on support spindle 15. Suspension 18 is connected to actuator arm 16 at mounting block 20. Flexure 22 is connected to an end of suspension 18, and carries slider 24. Disc 30 rotates around axis 32 so that windage is encountered by slider 24 to keep it aloft a predetermined small distance above the surface of disc 30. Slider 24 is equipped with a piezoelectric element (not shown in FIG. 1) for sensing asperities and irregularities on the surface of disc 30.

Figure 2:
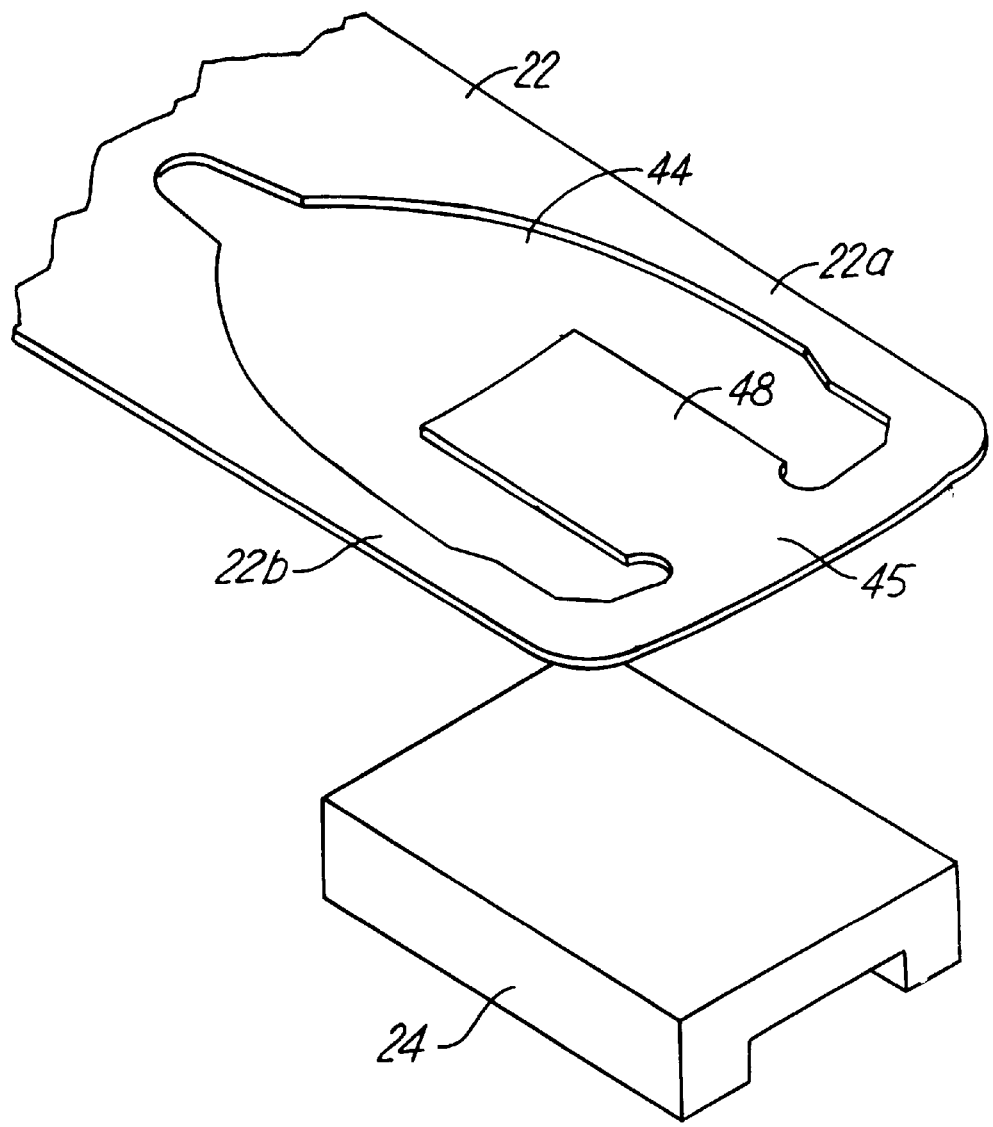
FIG. 2 is an exploded perspective view of a portion of the test system showing the interface between the flexure and the slider.

FIG. 2 is an exploded perspective view of a portion of the disc drive system shown in FIG. 1, showing flexure 22 and slider 24 in more detail. Flexure 22 is mounted to the underside of a distal end of head suspension 18 (FIG. 1). Flexure 22 includes arms 22a and 22b forming aperture 44 therebetween to provide resilience and gimbaling spring to flexure 22. The distal ends of arms 22a and 22b are connected via cross beam 45. Central tongue spring 48 extends from cross beam 45 into aperture 44 in a plane generally parallel to a plane defined by flexure arms 22a and 22b. The top surface of slider 24 is attached, such as by adhesive, to tongue spring 48.

Figure 3:
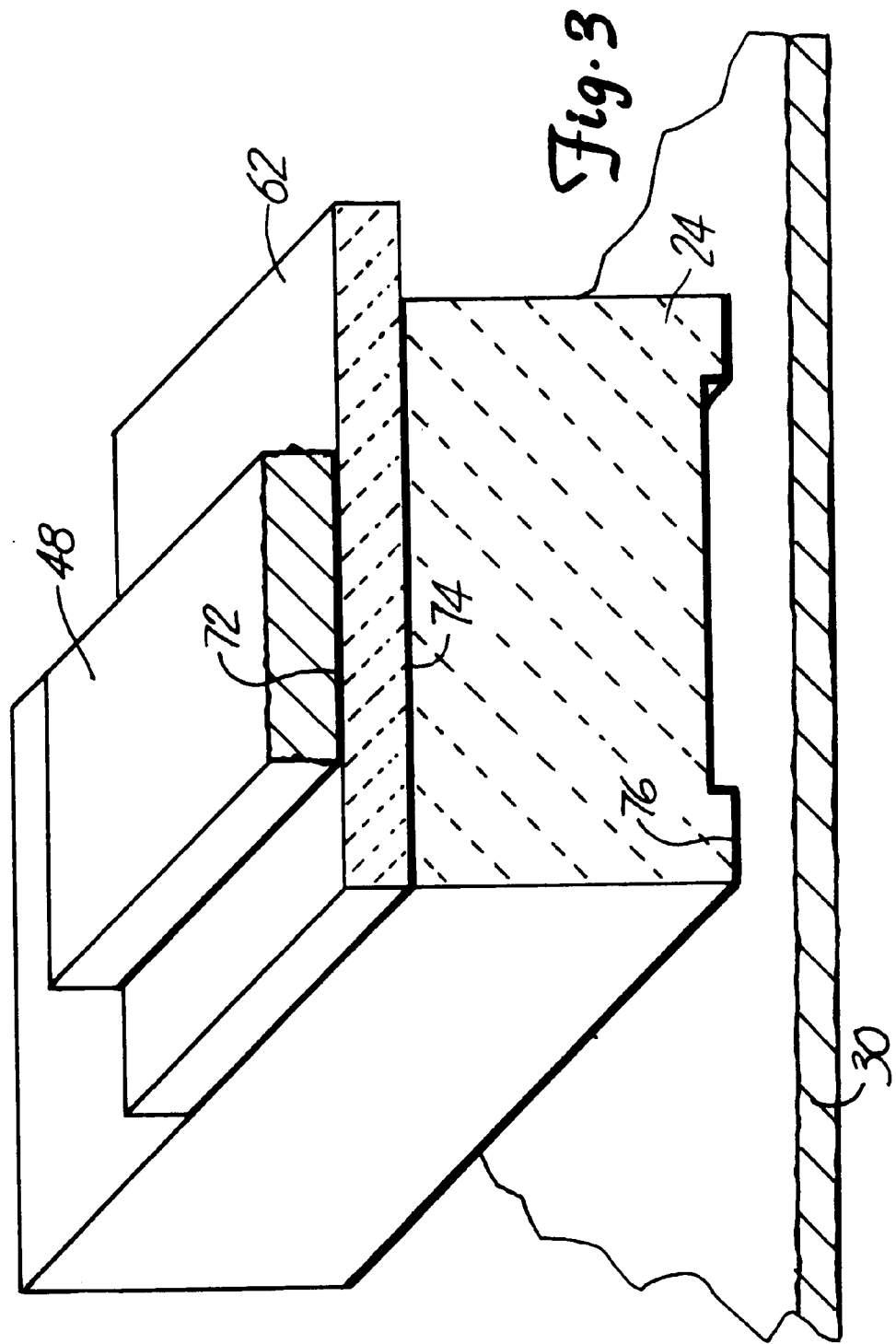
FIG. 3 is a perspective view of a glide test slider utilizing a top mounted piezoelectric element according to a first embodiment of the invention.

FIG. 3 is a perspective view of a glide test slider 24 utilizing a top mounted piezoelectric element 62 according to a first embodiment of the present invention. Piezoelectric element 62 is attached to slider 24 between the top surface of slider 24 and tongue spring 48 of flexure 22 (FIG. 2). Only tongue spring 48 of flexure 22 is shown in FIG. 3, to simplify the drawing.

Piezoelectric element 62 may pick up noise through tongue spring 48, or through slider 24 from the surface of disc 30 as the disc rotates. Therefore, in order to ensure that piezoelectric element 62 is electrically isolated from potential noise sources, interface 72 between piezoelectric element 62 and tongue spring 48 must be electrically isolated, and either interface 74 between piezoelectric element 62 and slider 24 or interface 76 between slider 24 and the surface of disc 30 must be electrically isolated.

Figure 4:
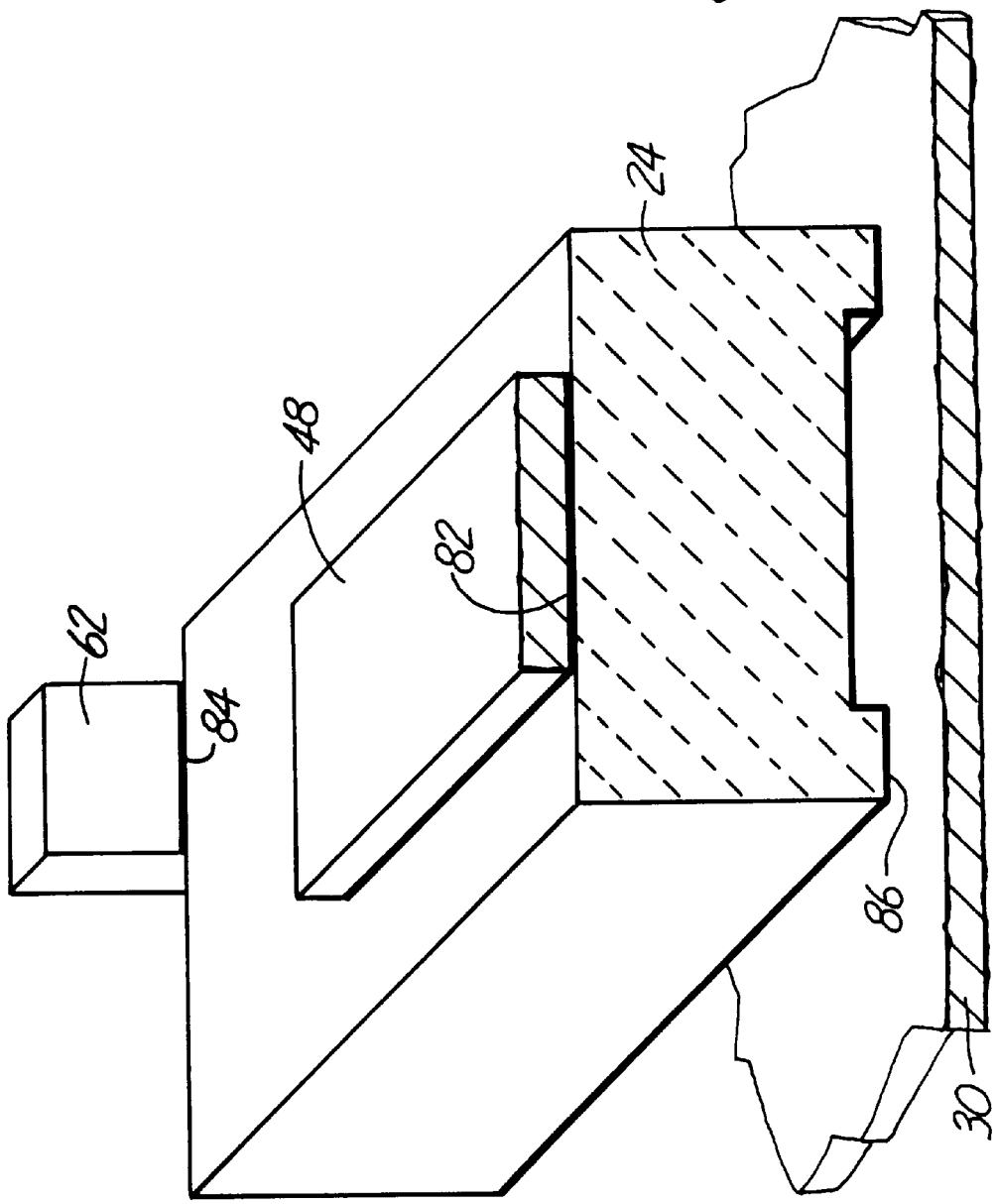
FIG. 4 is a perspective view of a glide test slider utilizing an end mounted piezoelectric element according to a second embodiment of the invention.

FIG. 4 is a perspective view of a glide test slider 24 utilizing an end mounted piezoelectric element 62 according to a second embodiment of the present invention. Piezoelectric element 62 is attached to an end surface of slider 24, and the top surface of slider 24 is attached to tongue spring 48 of flexure 22. Only tongue spring 48 of flexure 22 is shown in FIG. 4, to simplify the drawing.

Piezoelectric element 62 may pick up noise through slider 24 from tongue spring 48 or through slider 24 from the surface of disc 30 as the disc rotates. Therefore, in order to ensure that piezoelectric element 62 is electrically isolated from potential noise sources, interface 84 between piezoelectric element 62 must be electrically isolated, or interface 82 between tongue spring 48 and slider 24 and interface 86 between slider 24 and the surface of disc 30 must be electrically isolated.

Figure 5:
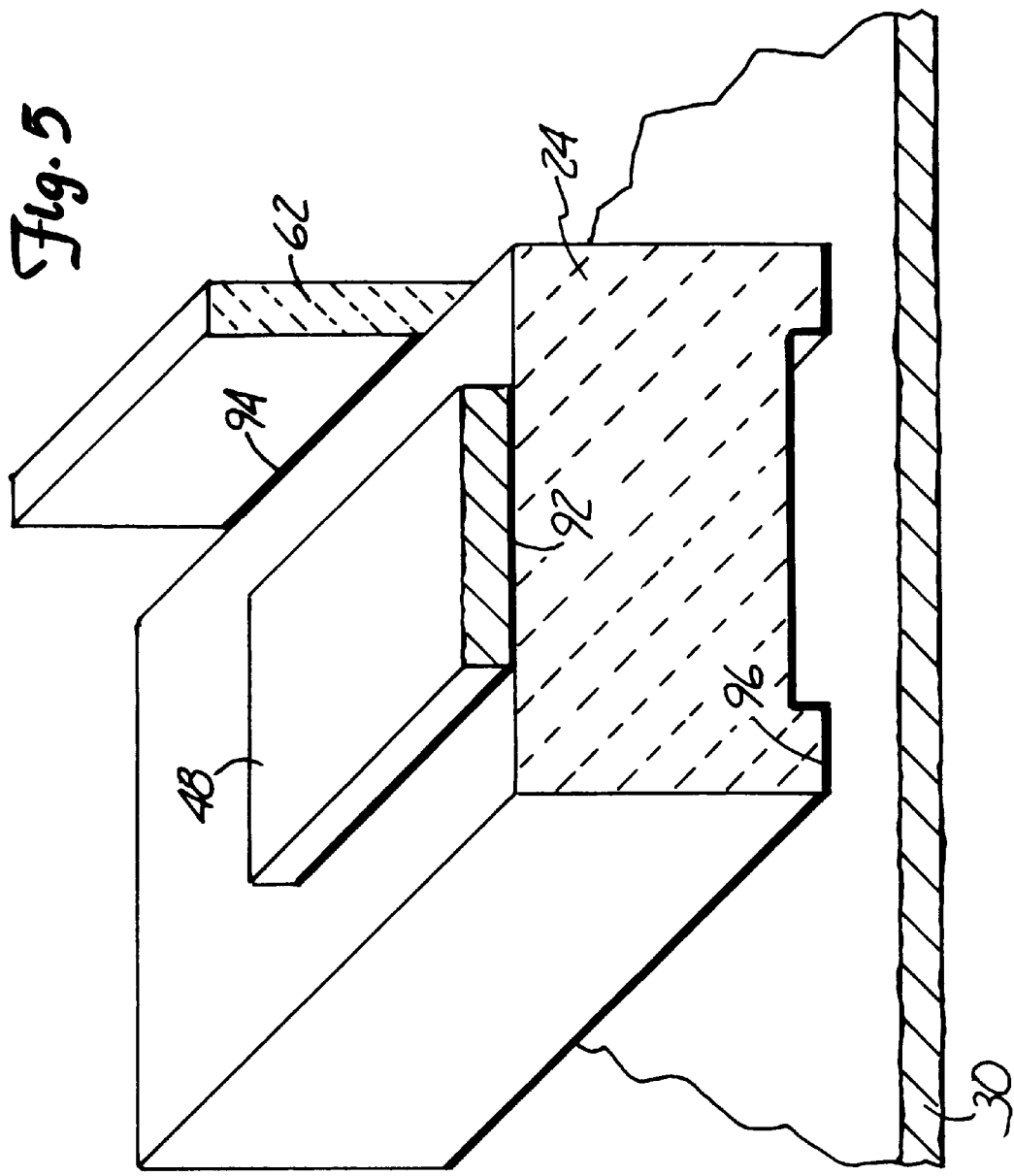
FIG. 5 is a perspective view of a glide test slider utilizing a side mounted piezoelectric element according to a third embodiment of the invention.

FIG. 5 is a perspective view of a glide test slider 24 utilizing a side mounted piezoelectric element 62 according to a third embodiment of the present invention. Piezoelectric element 62 is attached to a side surface of slider 24, and tongue spring 48 of flexure 22 is attached to the top surface of slider 24. Only tongue spring 48 of flexure 22 is shown in FIG. 5 to simplify the drawing.

Piezoelectric element 62 may pick up noise through slider 24 from tongue spring 48, or through slider 24 from the surface of disc 30 as the disc rotates. Therefore, in order to ensure that piezoelectric element 62 is electrically isolated from potential noise sources, interface 94 between piezoelectric element 62 and slider 24 must be electrically isolated, or interface 92 between tongue spring 48 and slider 24 and interface 96 between slider 24 and the surface of disc 30 must be electrically isolated.

Figure 6:
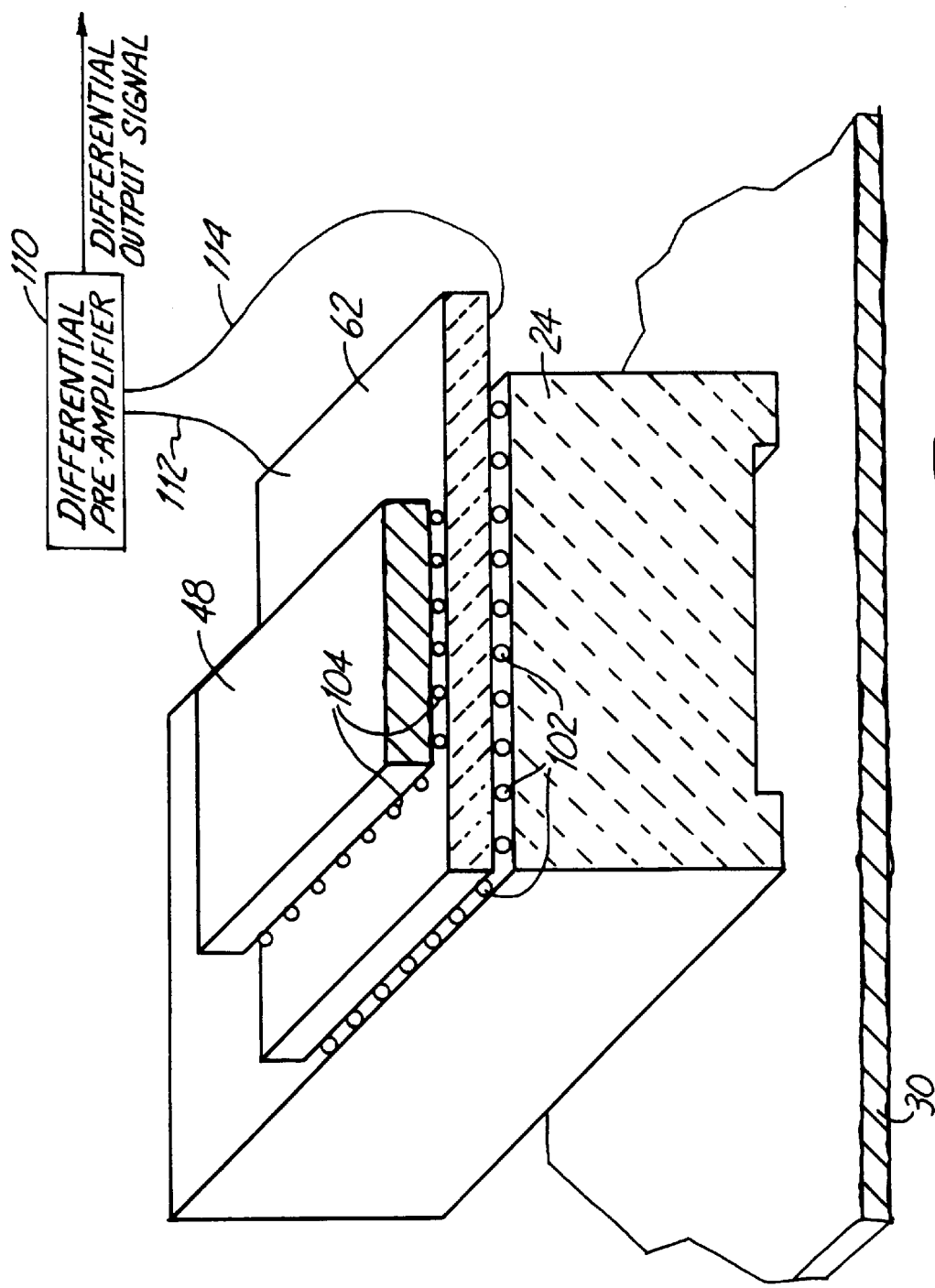
FIG. 6 is a perspective view of a glide test slider utilizing glass beads to ensure electrical isolation for a top mounted piezoelectric element according to a fourth embodiment of the invention.

FIG. 6 is a perspective view of a glide test slider 24 utilizing an electrically isolated top mounted piezoelectric element 62 according to a fourth embodiment of the present invention. Piezoelectric element 62 is attached between tongue spring 48 of flexure 22 and the top surface of slider 24, with glass beads 102 between piezoelectric element 62 and the top surface of slider 24 and glass beads 104 between piezoelectric element 62 and tongue spring 48. Only tongue spring 48 of flexure 22 is shown in FIG. 6 to simplify the drawing. Beads 102 and 104 are preferably approximately 1–2 thousandths of an inch in diameter, and electrically isolate piezoelectric element 62 from slider 24 and tongue spring 48, respectively. An epoxy material is preferably used on both sides of beads 102 and 104 to provide adhesive connections to the beads.

Other methods may be used to electrically isolate piezoelectric element 62 from potential noise sources. One possible solution is to insulate surfaces of slider body 24 on which an isolation interface is located. For example, a diamond-like carbon (DLC) material may be coated on any surface of slider 24 to electrically isolate the slider from piezoelectric element 62, flexure tongue spring 48, or disc 30, depending on the surface coated. Similarly, an insulator layer such as $Al_2O_3$, SiO, AlN, or others may be deposited on any surface of the slider to achieve the required electrical isolation. A non-conductive epoxy layer may be formed on any surface of slider 24 for electrical isolation, except for the bottom surface of the slider since epoxy is not a compatible material for interface with the surface of disc 30. Alternatively, slider 24 may itself be formed of a non-conductive material, such as SiC, BaTi, CaTi ferrite, silicon, sapphire, and many others. Any of these methods may be used to electrically isolate the appropriate surfaces of slider 24 from piezoelectric element 62, flexure tongue spring 48, and/or disc 30.

Electrical isolation of some interfaces may also be accomplished by insulating flexure tongue spring 48. A DLC material may be coated on the spring, or an insulating material such as $Al_2O_3$, SiO, AlN or others could be deposited on the spring. A non-conductive epoxy layer may be formed on the spring. An element made of an insulating material may be bonded to the spring. Alternatively, the spring itself may be formed of a non-conductive material such as a ceramic. Any of these methods may be used to electrically isolate flexure tongue spring 48 from the appropriate surfaces of slider 24 and/or piezoelectric element 62.

Finally, electrical isolation may further be achieved by insulating piezoelectric element 62. A DLC material may be coated on the top and bottom surface of the piezoelectric element after wires have been soldered onto the element, or after the contacts for connection to the wires have been masked. Similarly, an insulating material such as $Al_2O_3$, SiO, AlN or others may be deposited on piezoelectric element 62 after the wires have been soldered or the contacts have been masked. A secondary non-conductive material such as glass, mica or others may be bonded on the top and/or bottom surface of piezoelectric element 62. Any of these methods may be used to electrically isolate piezoelectric element 62 from the appropriate surfaces of slider 24 and/or flexure tongue spring 48.

One advantage of electrically isolating the piezoelectric element 62 in the manner of the present invention is that a double-ended, or differential pre-amplifier 110 may be used to amplify the signal across the piezoelectric element 62, as illustrated in FIG. 6. The pre-amplifier 110 typically connects to the first and second sides of piezoelectric element 62 by wires 112 and 114, which pick up ambient electrical noise from adjacent equipment, overhead lights, or other sources. A differential pre-amplifier 110 cancels the noise present on each of the wires 112 and 114 (known as common mode noise), providing a differential output signal proportional to the difference between the signal present on a first wire 112 (one side of the piezoelectric element 62) and the signal present on a second wire 114 (the opposite side of the piezoelectric element 62). If the piezoelectric element 62 were not electrically isolated, there would be a path to ground through the slider 24 to the disc 30, and a differential pre-amplifier 110 therefore could not be used.

The present invention electrically isolates a piezoelectric element on a glide height test slider from potential noise sources such as the slider body, the suspension, and the disc media to reduce the level of noise picked up by the piezoelectric element. Reducing the noise level increases the sensitivity of the glide height tester, resulting in increased accuracy in detecting small defects on the surface of the disc, which is particularly important as the required glide height for disc drive sliders continues to decrease. Electrically isolating the piezoelectric element also enables use of a differential pre-amplifier, which cancels out common mode noise present on the wires connecting the piezoelectric element to the pre-amplifier and thereby improves the performance of the glide height tester.

Although the present invention has been described with reference to preferred embodiments, workers skilled in the art will recognize that changes may be made in form and detail without departing from the spirit and scope of the invention. For example, variations and modifications in the methods used to insulate the appropriate surfaces of the slider, piezoelectric element, and flexure tongue spring may be made, and are contemplated by the present invention.

We claim:

1. A glide height test slider for detecting irregularities on a surface of a rotatable disc comprising:
    a slider body;
    means for sensing vibration of the slider body due to irregularities on the surface of a rotatable disc; and
    means for electrically isolating the slider body means for sensing vibration from the rotatable disc, including means for electrically isolating the slider body from the surface of the rotatable disc.

2. A high resolution, low noise glide height test slider for detecting irregularities on a surface of a rotatable disc, comprising:
    a slider body arranged to be supported by a support structure in predetermined spaced relation to the surface of the disc as it is rotating;
    a piezoelectric element on the slider body to sense vibration forces acting on the slider body; and
    means on the slider for electrically isolating the piezoelectric element from the rotatable disc, including means for electrically isolating the slider body from the surface of the rotatable disc.

3. The glide height test slider of claim 2, wherein the means on the slider for electrically isolating the piezoelectric element comprises:
    means for electrically isolating the piezoelectric element from the slider body.

4. The glide height test slider of claim 3, wherein the means on the slide, for electrically isolating the piezoelectric element comprises a plurality of insulating beads adhesively disposed between the piezoelectric element and the support structure, and a plurality of insulating beads adhesively disposed between the slider body and the piezoelectric element.

5. The glide height test slider of claim 2, wherein the slider body is arranged to be directly connected to the support structure and the means on the slider electrically isolates the piezoelectric element from the slider body.

6. The glide height test slider of claim 2, wherein the slider body is arranged to be directly connected to the support structure and the means on the slider for electrically isolating the piezoelectric element comprises first means for electrically isolating the support structure from the slider body, and second means for electrically isolating the slider body from the surface of the rotatable disc.

7. The glide height test slider of claim 2, wherein the means for electrically isolating the piezoelectric element comprises a plurality of insulating beads adhesively disposed between the piezoelectric element and the support structure.

8. The glide height test slider of claim 2, further comprising a differential pre-amplifier connected by wires to first and second sides of the piezoelectric element.

9. The glide height test slider of claim 2, wherein the means on the slider for electrically isolating the piezoelectric element comprises:
    means for electrically isolating the slider body from the support structure.

10. A high resolution, low noise glide height test slider for detecting irregularities on a surface of a rotatable disc, comprising:
    a slider body arranged to be supported by a support structure in predetermined spaced relation to the surface of the disc as it is rotating;
    a piezoelectric element attached to the slider body to sense vibration forces acting on the slider body;
    isolation means for electrically isolating the piezoelectric element from external electrical noise from the support structure and the surface of the disc; and
    a differential preamplifier electrically connected to first and second sides of the piezoelectric element.

11. The glide height test slider of claim 10, wherein the isolation means comprises means on the slider for electrically isolating the piezoelectric element from the slider body.

12. The glide height test slider of claim 10, wherein the isolation means comprises means on the slider for electrically isolating the piezoelectric element from the support structure, and means on the slider for electrically isolating the slider body from the surface of the rotatable disc.

13. The glide height test slider of claim 10, further comprising a differential pre-amplifier connected by wires to first and second sides of the piezoelectric element.

14. A high resolution, low noise glide height test slider for detecting irregularities on a surface of a rotatable disc, comprising:
    a slider body arranged to be supported by a support structure over the surface of the rotatable disc;
    a piezoelectric element between the slider body and the support structure to sense vibration forces acting on the slider body; and
    isolation means for electrically isolating the piezoelectric element from external electrical noise from the surface of the rotatable disc and from the support structure; and
    a differential preamplifier electrically connected to first and second sides of the piezoelectric element.

15. The glide height test slider of claim 14, wherein the isolation means comprises first means on the slider for electrically isolating the piezoelectric element from the support structure and second means on the slider for electrically isolating the piezoelectric element from the slider body.

16. The glide height test slider of claim 15, wherein the first means comprises a plurality of insulating beads adhesively disposed between the piezoelectric element and the support structure, and the second means comprises a plurality of insulating beads adhesively disposed between the slider body and the piezoelectric element.

17. The glide height test slider of claim 14, wherein the isolation means comprises first means on the slider for electrically isolating the piezoelectric element from the support structure and second means on the slider for electrically isolating the slider body from the surface of the rotatable disc.

18. The glide height test slider of claim 14, further comprising a differential pre-amplifier connected by wires to first and second sides of the piezoelectric element.

* * * * *